United States Patent
Kwon et al.

(10) Patent No.: US 9,204,476 B2
(45) Date of Patent: Dec. 1, 2015

(54) METHOD AND APPARATUS FOR DIRECT COMMUNICATIONS IN A WIRELESS COMMUNICATION SYSTEM

(75) Inventors: Yeong Hyeon Kwon, Anyang-si (KR); Han Gyu Cho, Anyang-si (KR); Ji Woong Jang, Anyang-si (KR); Hyun Woo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 13/502,710

(22) PCT Filed: Jun. 15, 2010

(86) PCT No.: PCT/KR2010/003821
§ 371 (c)(1),
(2), (4) Date: Apr. 18, 2012

(87) PCT Pub. No.: WO2011/132818
PCT Pub. Date: Oct. 27, 2011

(65) Prior Publication Data
US 2013/0029675 A1  Jan. 31, 2013

Related U.S. Application Data

(60) Provisional application No. 61/327,111, filed on Apr. 23, 2010.

(51) Int. Cl.
*H04W 72/04* (2009.01)
*H04W 76/02* (2009.01)
*H04W 92/18* (2009.01)

(52) U.S. Cl.
CPC ............ *H04W 76/023* (2013.01); *H04W 72/04* (2013.01); *H04W 92/18* (2013.01)

(58) Field of Classification Search
CPC .... H04W 72/04; H04W 76/02; H04W 76/023
See application file for complete search history.

(56) References Cited

U.S. PATENT DOCUMENTS

| | | | | |
|---|---|---|---|---|
| 2003/0235174 A1* | 12/2003 | Pichna et al. | | 370/338 |
| 2007/0086424 A1* | 4/2007 | Calcev et al. | | 370/350 |
| 2007/0286136 A1* | 12/2007 | Rittle et al. | | 370/338 |
| 2009/0011778 A1* | 1/2009 | Jung et al. | | 455/456.3 |
| 2009/0017858 A1* | 1/2009 | Kwon et al. | | 455/519 |
| 2009/0323659 A1* | 12/2009 | Zhang | | 370/338 |

FOREIGN PATENT DOCUMENTS

| | | |
|---|---|---|
| KR | 1020010047105 | 6/2001 |
| KR | 1020010097867 | 11/2001 |

OTHER PUBLICATIONS

PCT International Application No. PCT/KR2010/003821, Written Opinion of the International Searching Authority dated May 31, 2011, 14 pages.

\* cited by examiner

*Primary Examiner* — Mazda Sabouri
(74) *Attorney, Agent, or Firm* — Lee, Hong, Degerman, Kang & Waimey

(57) ABSTRACT

The present invention relates to a method and apparatus for direction communications in a wireless communication system. In the direct communication support method of a wireless communication system, according to one embodiment of the present invention, when a base station receives a direct communication request message from a first terminal to request a direct communication with a second terminal without going through the base station, the base station then allocates resources to be used for the direct communication and transmits resource allocation information to the first and second terminals.

2 Claims, 11 Drawing Sheets

METHOD AND APPARATUS FOR DIRECT COMMUNICATIONS IN A WIRELESS COMMUNICATION SYSTEM

CROSS-REFERENCE TO RELATED APPLICATIONS

This application is the National Stage filing under 35 U.S.C. 371 of International Application No. PCT/KR2010/003821, filed on Jun. 15, 2010, which claims the benefit of U.S. Provisional Application Ser. No. 61/327,111, filed on Apr. 23, 2010, the contents of which are all incorporated by reference herein in their entirety.

TECHNICAL FIELD

The present invention relates to a wireless communication system, and more particularly, to a method and apparatus for direct communication in a wireless communication system.

BACKGROUND ART

Generally, a communication between terminals located in a close distance may be defined as peer-to-peer configuration. In the peer-to-peer communication, a random access scheme between communication subjects is defined and the communication subjects perform communications according to a prescribed protocol. And, in the peer-to-peer communication, it may be unnecessary to consider whether a communication subject is connected to a public internet network.

On the other hand, it is mandatory for a communication in a cellular network to be defined as a communication between a base station or an existence equivalent to the base station and a terminal. All communication behaviors are controlled by the base station or the existence equivalent to the base station. In particular, the cellular network is configured to obtain a maximum throughput by put limitation on operations of all terminals according to a predetermined rule. Yet, this rule may be inefficient in accordance with an application or a channel environment of a terminal.

For instance, when a channel environment of a terminal is vulnerable, limitation is put on using an optimal communication path by finding a new access path. FIG. 1 is a diagram for a case of performing a communication via a neighbor terminal when a channel environment of a terminal is vulnerable.

Referring to FIG. 1, when a terminal is located in a shadow area, if the terminal performs a communication with a base station via a neighbor terminal having a good channel environment, it may be able to improve power efficiency and throughput of the terminal. However, in a cellular network of a related art, since it is mandatory for a communication to be performed via a base station, it may be difficult to obtain such an advantage as shown in FIG. 1.

According to the related art, terminals should perform short-range communications via a base station, each of the terminals consumes considerable amount of power. In particular, in case that a communication is performed between terminals in short distance, it is under the control of a base station and accompanies with such a considerably unreasonable communication structure as data is forwarded to a base station and then transmitted to a target terminal.

A cellular network does not allow a terminal-to-terminal communication but supports a similar structure. For instance, there is a data transmitting structure in which a terminal transmits data by accessing a useful relay node nearby instead of directly communicating with a base station. If the terminal uses the relay node, it may be able to obtain higher spectral efficiency with smaller power than forwarding data to the base station in direct.

Yet, a relay node is not a terminal but works as an access point for connecting to a network, which is a considerable disadvantage. In particular, in case that a terminal attempts to transmit data to a neighbor terminal by itself, the data needs to be transmitted to a relay node, which makes the terminal burdensome. Thus, although power consumption is adjustable to some extend using a relay node, it is still burdensome to utilize the relay node for a terminal-to-terminal communication absolutely.

FIG. 2 is a diagram for a terminal-to-terminal communication using a relay node.

Referring to FIG. 2, assume that a terminal A transmits data to a relay node and that the relay node transmits the data to a terminal B in the same relay node area via local forwarding. In this case, a terminal should match a power level to overcome a pathloss to a relay node and the relay node should transmit data with power to overcome a pathloss to a terminal. If a power level is raised, interference with another neighbor terminal increases. Hence, a frequency resource used for the data transmission is hardly usably by another terminal.

Formula 1 is a pathloss model used by Bluetooth. Referring to Formula 1, a pathloss exponentially increases in proportion to a distance.

$$\text{Pathloss} = 20 \log(4*pi*r/\text{lambda}) \text{ for } r \leq 8m$$

$$\text{Pathloss} = 58.3 + 33 \log(r/8) \text{ for } r > 8 \qquad \text{[Formula 1]}$$

FIG. 3 is a graph of a pathloss model of Bluetooth.

For instance, assume that a distance between terminals is 2 meters and that a distance between a terminal and a rely node is 20 meters, when a communication is performed via a relay node, transmission power required for the consumption of the terminal is greater than that of a direct terminal-to-terminal communication by 25 dB or higher. In particular, it can be observed that a difference in an amount of energy is about 300 times or more. Thus, in order to perform a transmission via a relay node, a terminal should consume a power considerably more than that required for a direct communication to result in a very inefficient energy consumption pattern. Such a result may generate a serious difference from such a battery-based operating terminal as an M2M device having difficulty in battery replacement.

In order to enable a short-range communication with low power consumption, a terminal should have a structure of utilizing a different radio access technology (hereinafter abbreviated RAT). However, if a terminal includes multi-RAT, a chip size increases. And, the terminal should have a multi radio frequency (hereinafter abbreviated RF) structure and an antenna structure, whereby complexity increases as well.

DISCLOSURE OF THE INVENTION

Technical Problem

However, as mentioned in the foregoing description, a cellular system according to a relayed art has a problem of consuming considerable amount of power for a communication between terminals located in short distance. And, if multi-RAT is adopted, a chip size and complexity of a terminal may increase.

An object of the present invention is to provide a method of direct communication, by which short-range communication is enabled with low power.

Technical tasks obtainable from the present invention are non-limited by the above mentioned effect. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, in a base station of a wireless communication system, a direct communication supporting method according to one embodiment of the present invention includes the steps of receiving a direct communication request message from a $1^{st}$ terminal to request a direct communication with a $2^{nd}$ terminal without going through the base station, allocating a resource to use for the direct communication, and transmitting resource allocation information to the $1^{st}$ terminal.

In this case, in the direct communication request message may include an identification information of the $2^{nd}$ terminal.

To further achieve these and other advantages and in accordance with the purpose of the present invention, in a $1^{st}$ terminal of a wireless communication system, a direct communication method according to another embodiment of the present invention may include the steps of transmitting a direct communication request message to a base station to request a direct communication with a $2^{nd}$ terminal without going through the base station and receiving resource allocation information on a resource allocated to the direct communication from the base station.

In this case, synchronization may be matched with the $2^{nd}$ terminal and data may be transmitted to the $2^{nd}$ terminal.

Moreover, the resource allocation information may be transmitted to the $2^{nd}$ terminal.

To further achieve these and other advantages and in accordance with the purpose of the present invention, in a $1^{st}$ terminal of a wireless communication system, a direct communication method according to another embodiment of the present invention may include the steps of transmitting a preamble, receiving a $1^{st}$ direct communication request message from a $2^{nd}$ terminal to request a direct communication with the $1^{st}$ terminal without going through a base station, transmitting a $2^{nd}$ direct communication request message to the base station to request the direct communication with the $2^{nd}$ terminal without going through the base station, and receiving control information related to the direct communication from the base station.

In this case, the $1^{st}$ terminal may transmit the control information related to the direct communication to the $2^{nd}$ terminal and may set synchronization with the $2^{nd}$ terminal.

And, the control information related to the direct communication may include resource allocation information on a resource allocated to the direct communication.

Moreover, the preamble may be transmitted on a random access channel.

To further achieve these and other advantages and in accordance with the purpose of the present invention, a base station according to another embodiment of the present invention may include a receiving module receiving a direct communication request message from a $1^{st}$ terminal to request a direct communication with a $2^{nd}$ terminal without going through the base station, a processor allocating a resource to use for the direct communication, and a transmitting module transmitting resource allocation information to the $1^{st}$ terminal and the $2^{nd}$ terminal.

To further achieve these and other advantages and in accordance with the purpose of the present invention, a $1^{st}$ terminal according to a further embodiment of the present invention may include a transmitting module transmitting a $1^{st}$ direct communication request message to a base station to request a direct communication with a $2^{nd}$ terminal without going through the base station and a receiving module receiving resource allocation information on a resource allocated to the direct communication from the base station.

Moreover, the transmitting module may transmit a preamble and the receiving module may receive a $2^{nd}$ direct communication request message from the $2^{nd}$ terminal to request the direct communication with the $1^{st}$ terminal without going through the base station.

Advantageous Effects

According to embodiments of the present invention, a short-range communication can be efficiently performed with low power.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP2 802.16 system, they are applicable to other random mobile communication systems except unique features of the 3GPP2 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, an eNode B, a BS and the like.

Figure 1:
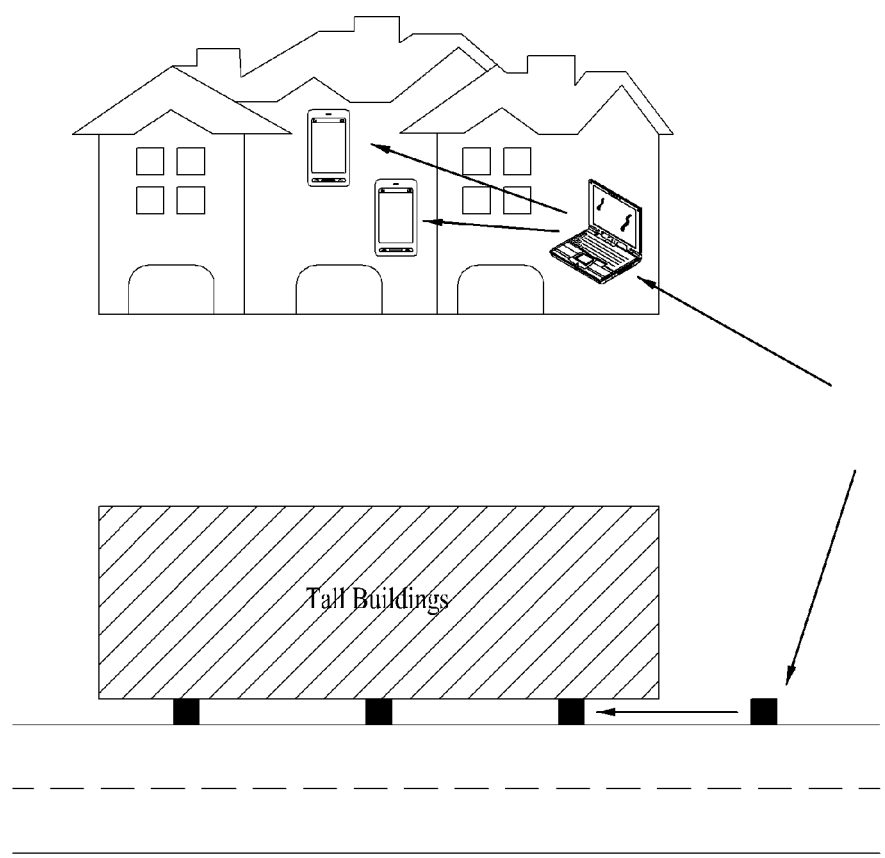
FIG. 1 is a diagram for a case of performing a communication via a neighbor terminal when a channel environment of a terminal is vulnerable.
Figure 2:
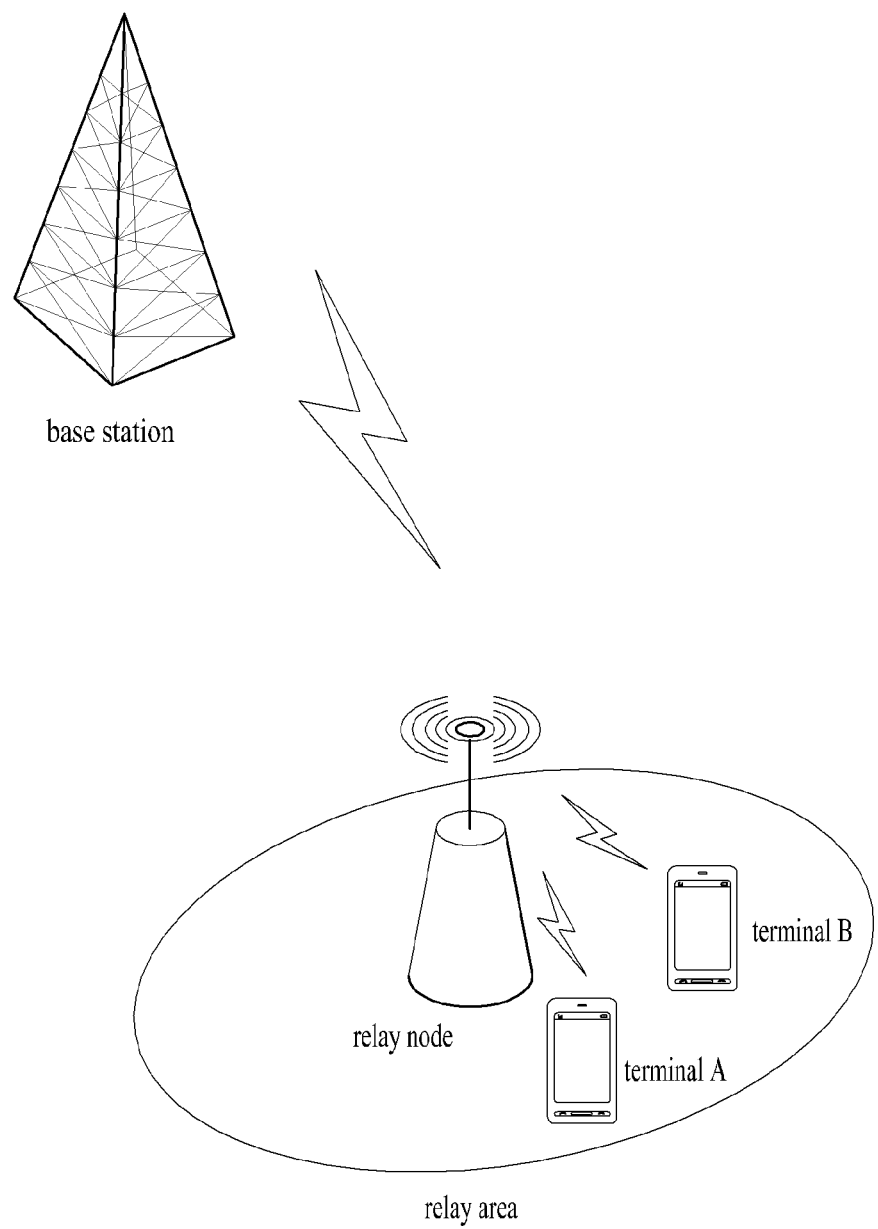
FIG. 2 is a diagram for a terminal-to-terminal communication using a relay node.
Figure 3:
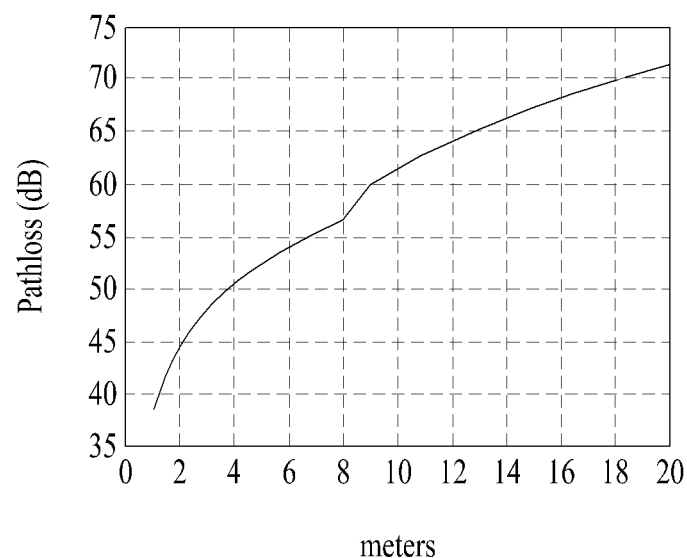
FIG. 3 is a graph of a pathloss model of Bluetooth.
Figure 4:
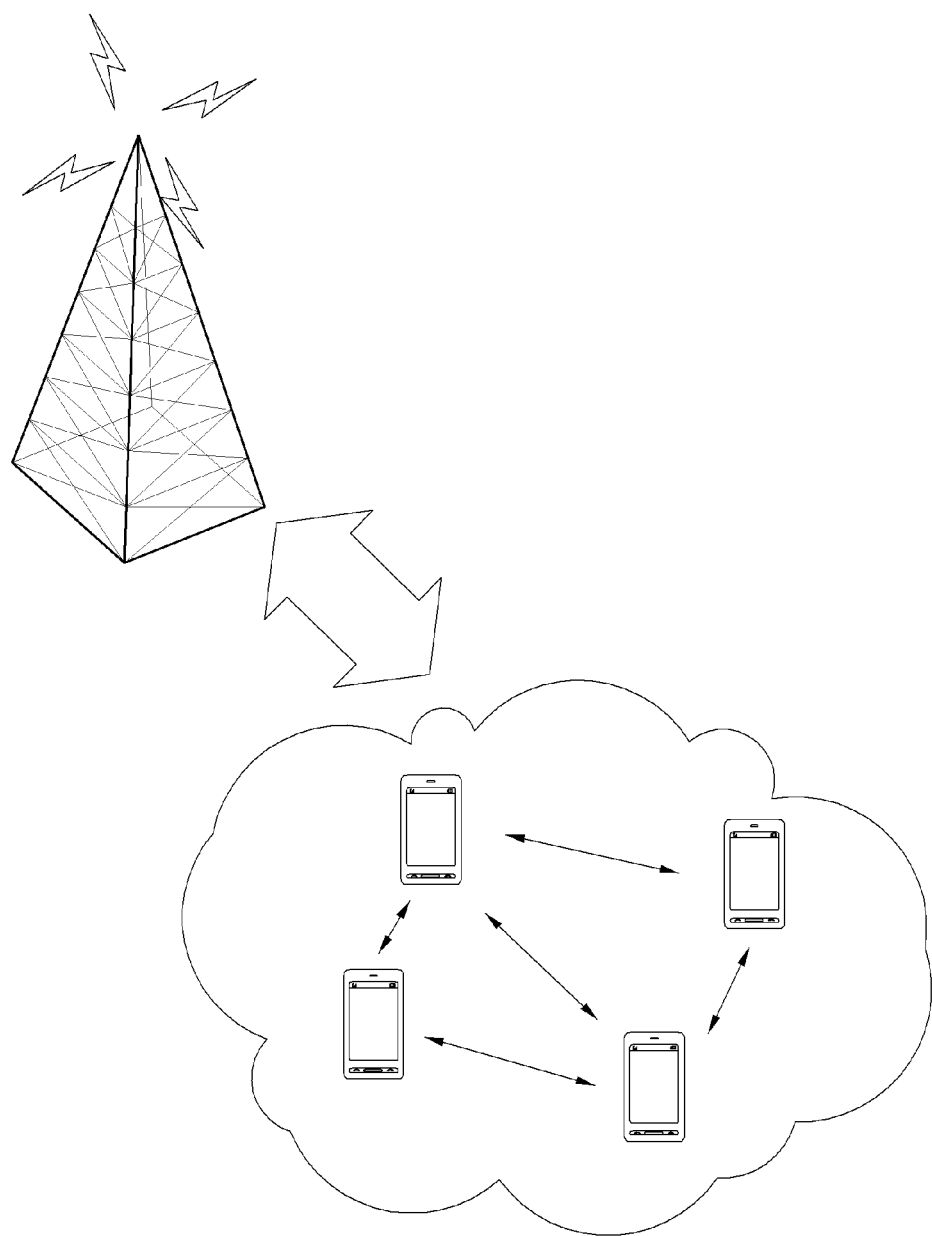
FIG. 4 is a diagram for a case that a communication of a terminal is granted.

FIG. 4 is a diagram for a case that a communication of a terminal is granted. Referring to FIG. 4, when M2M devices are present, in a configuration that an M2M server accesses each of the M2M devices via a base station, a specific device may play a role as an aggregator. Alternatively, in case that an owner in charge of managing and operating the M2M devices manages and operates the M2M devices by being located in the vicinity of the corresponding devices, data may be directly forwarded to a managing device of the owner instead of being forwarded to the base station. If so, compared to a case of using a plurality of RATs, this case enables a terminal not to include a modem for a plurality of the RATs. Therefore, it may be able to configure a low-cost ecosystem. Moreover, since the multi-RAT is not used, it may be unnecessary to implement a processing configuration for an unnecessary application layer. In particular, if a short-range communication and a cellular network access are granted by utilizing one RAT, it may be able to configure a very efficient ecosystem of M2M devices. This feature may be applicable to a human device in the same manner as well. In this case, both a short-range communication and a long-range communication may be performed with low power and via a device having low complexity. And, it may be able to manage a quality of service (QoS) to efficiently manage a power consumption level or throughput.

Figure 5:
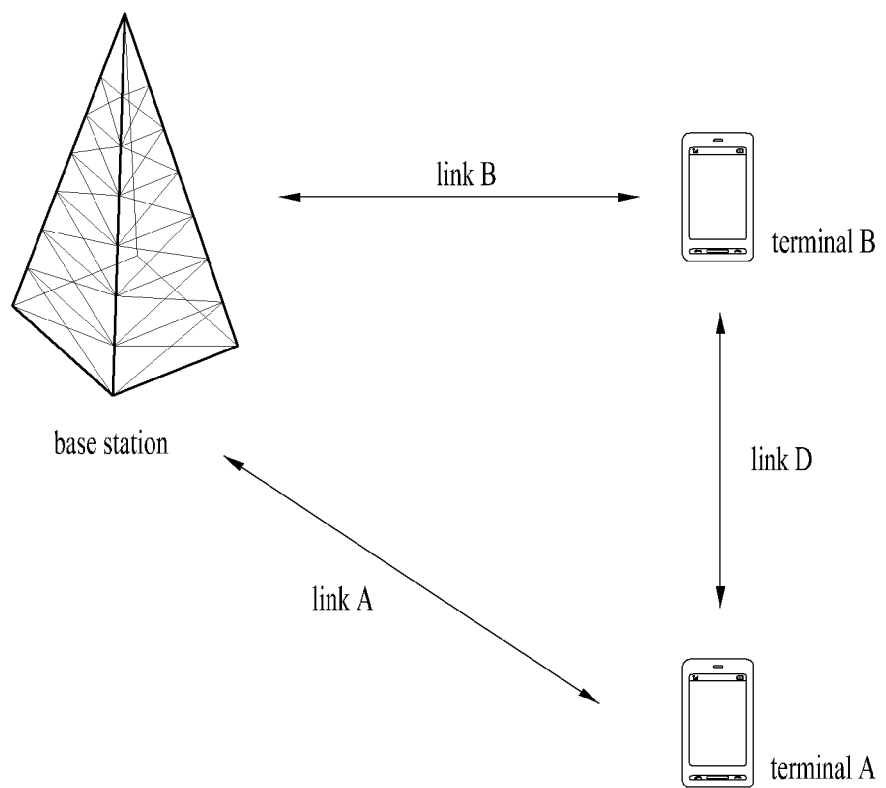
FIG. 5 is a diagram for a direct communication method according to an embodiment of the present invention.

In the following description, a direct communication method according to an embodiment of the present invention is explained with reference to the accompanying drawings. FIG. 5 is a diagram for a direct communication method according to an embodiment of the present invention.

A direct communication is normally configured as peer-to-peer or peer-to-multipoint.

Referring to FIG. 5, a link A is a connection for a communication between a terminal A and a base station, a link B is a connection for a communication between a terminal B and a base station, and a link D is a connection for a communication between a terminal A and a terminal B.

A terminal attempting to transmit data is named a source terminal and a counterpart terminal to which the source terminal attempts to transmit data is named a destination terminal. According to an embodiment of the present invention, assume that the terminal A is the source terminal and that the terminal B is the destination terminal.

In a normal communication environment, the link A and the link B maintain a channel status enough for a terminal to communicate with a base station. Yet, it may often occur that a channel status of a link between a source terminal and a base station is not good or that a channel status of a link between a terminal and a base station is not good. Therefore, a setting for a direct communication between terminals may vary in accordance with a status of the link A and a status of the link B.

First of all, in case that both a channel status of a link A and a channel status of a link B are good, a direct communication method according to an embodiment of the present invention is described with reference to FIG. 6 as follows.

Figure 6:
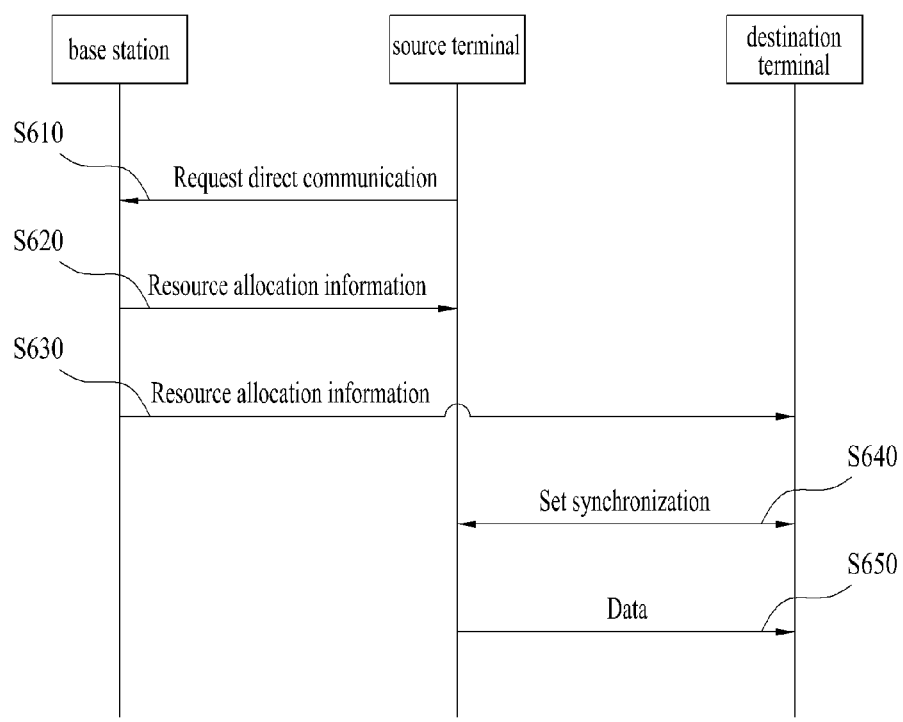
FIG. 6 is a diagram for a direct communication method according to an embodiment of the present invention in case that both a channel status of a link A and a channel status of a link B are good.

FIG. 6 is a diagram for a direct communication method according to an embodiment of the present invention in case that both a channel status of a link A and a channel status of a link B are good.

In case that both a channel status of a link A and a channel status of a link B are good, a base station is able to directly access a source terminal or a destination terminal and each of the terminals may be able to transceive control signals and data with the base station. In this case, in case of performing a direct communication, the settings of a communication channel between the source terminal and the destination terminal and the traffic transmission between the source terminal and the destination terminal should be instructed to each of the source terminal and the destination terminal by the base station.

Referring to FIG. 6, in case that a source terminal attempts to establish a communication connection to a destination terminal, the source terminal informs a base station of information on the destination terminal and also makes a request for a direct communication with the destination terminal [S610]. In this case, the information on the destination terminal may include such information for identifying the destination terminal as an IP address, a phone number and the like.

Having received the request for the direct communication, the base station allocates a resource to be used for the direct communication between the source terminal and the destination terminal [S620, S630]. The base station then transmits resource allocation information to the source terminal and the destination terminal.

Subsequently, the source and destination terminals set synchronization [S640]. Each of the source terminal and the destination terminal checks synchronization and configuration information on a communication link between terminals to activate a link D.

After the synchronization between the source terminal and the destination terminal has been set, the source terminal transmits data to the destination terminal [S650].

In case that both a channel status of a link A and a channel status of a link B are good, a base station is able to control a resource and power level, which are to be set for a link D, in detail.

In the following description, in case that a channel status of a link A is good and that a channel status of a link B is not good, a direct communication method according to an embodiment of the present invention is explained with reference to FIG. 7.

Figure 7:
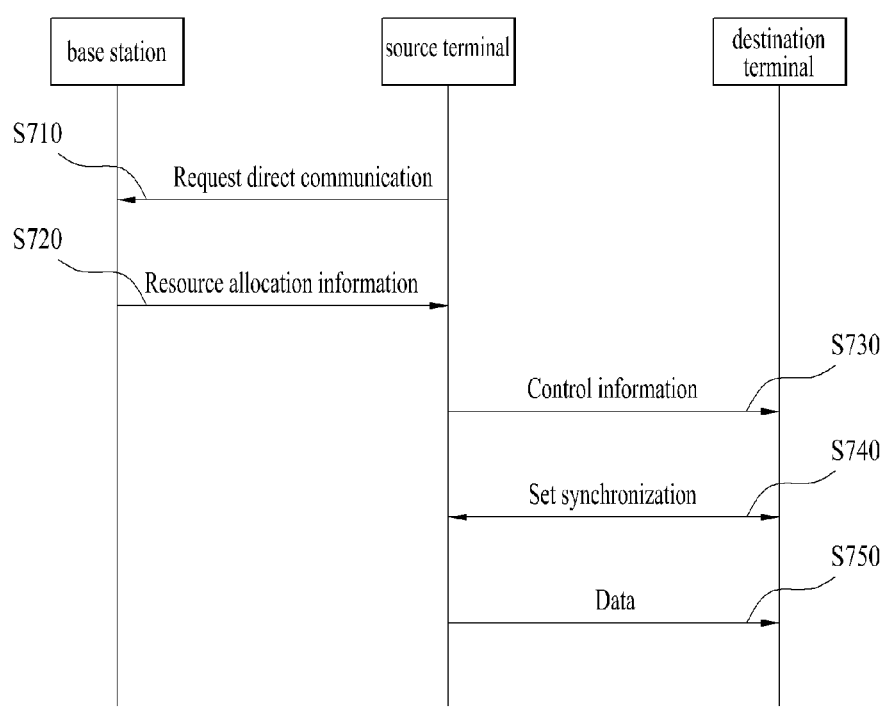
FIG. 7 is a diagram for a direct communication method according to an embodiment of the present invention in case that a channel status of a link A is good and that a channel status of a link B is not good.

FIG. 7 is a diagram for a direct communication method according to an embodiment of the present invention in case that a channel status of a link A is good and that a channel status of a link B is not good.

First of all, in case that a channel status of a link A is good and that a channel status of a link B is not good, since a destination terminal is unable to receive control information from a base station, a source terminal receives the control information from the base station and then transmits the received control information to the destination terminal.

Referring to FIG. 7, in case that a source terminal attempts to establish a communication connection to a destination terminal, the source terminal informs a base station of information on the destination terminal and also makes a request for a direct communication with the destination terminal [S710]. In this case, the information on the destination terminal may include such information for identifying the destination terminal as an IP address, a phone number and the like.

Having received the request for the direct communication, the base station allocates a resource to be used for the direct communication between the source terminal and the destination terminal and then transmits resource allocation information to the source terminal [S720].

In case that the base station has difficulty in controlling the destination terminal or needs a considerable amount of power consumption to control the destination terminal, the base station may set the source terminal to directly control the destination terminal. In doing so, since the base station may not be aware of a state of the destination terminal, the destination terminal should have all information forwarded from the source terminal.

The source terminal transmits control information to the destination terminal using the resource allocated set up a link with the destination terminal [S730]. In this case, the control information transmitted to the destination terminal by the source terminal includes resource allocation information.

As the destination terminal is not managed and operated by the base station, if an automatic connection is not available, a user may be able to set the destination terminal to receive the control information from the source terminal.

Subsequently, the source and destination terminals set synchronization [S740]. Each of the source terminal and the destination terminal checks synchronization and configuration information on a communication link between terminals to activate a link D.

After the synchronization between the source terminal and the destination terminal has been set, the source terminal transmits data to the destination terminal [S750].

If the destination terminal receives a communication structure and configuration information by receiving the control information from the source terminal, the destination terminal should receive data and control signal on a resource region allowed by the source terminal only. And, a transmission power level of the destination terminal is controlled by the source terminal.

A source to be used by the source terminal should be allocated by the base station. And, a structure, transmission mode, transmission power and the like for the data communication should be forward to or received from the base station.

In the following description, in case that a channel status of a link A is not good and that a channel status of a link B is good, a direct communication method according to an embodiment of the present invention is explained with reference to FIG. 8.

Figure 8:
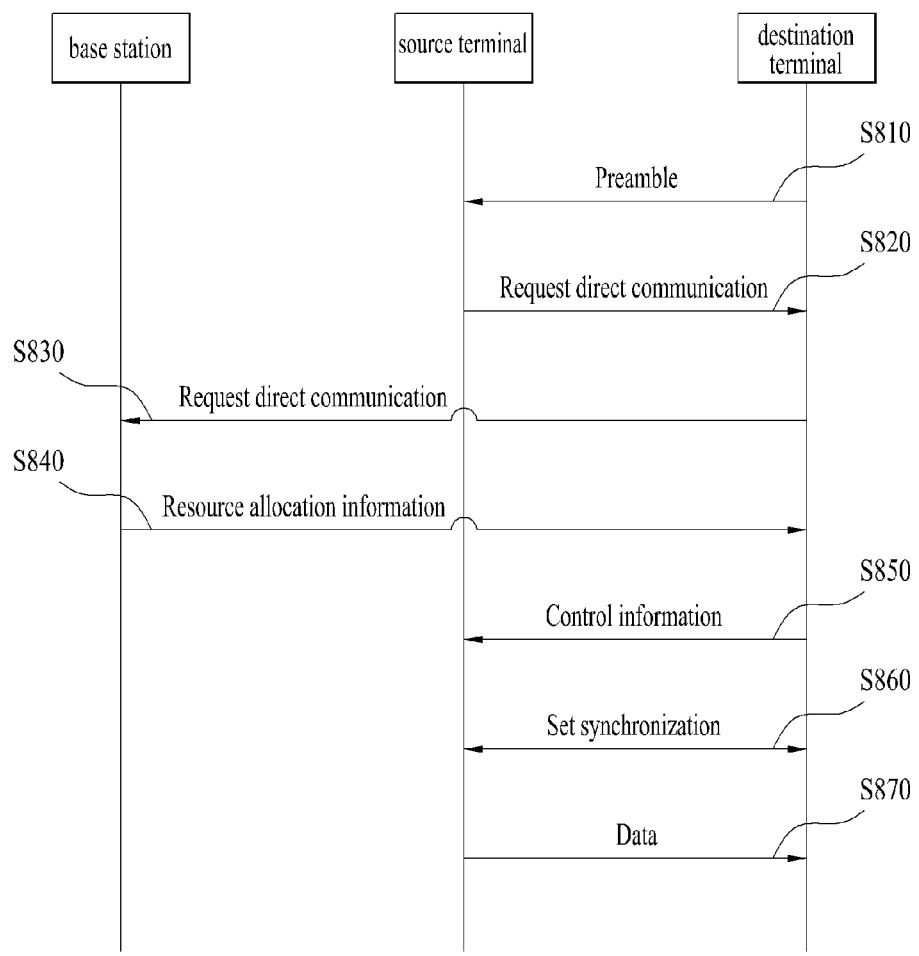
FIG. 8 is a diagram for a direct communication method according to an embodiment of the present invention in case that a channel status of a link A is not good and that a channel status of a link B is good.

FIG. 8 is a diagram for a direct communication method according to an embodiment of the present invention in case that a channel status of a link A is not good and that a channel status of a link B is good.

First of all, in case that a channel status of a link A is not good and that a channel status of a link B is good, all coordination and the setting of the relation with the base station should be performed by the destination terminal.

In order for a source terminal to be connected with a destination terminal, the destination terminal transmits a preamble to enable the source terminal to search for the destination terminal [S810]. When a channel status of a link between the source terminal and the destination terminal is not good, in order to perform a direct communication, the destination terminal should transmit the preamble to enable to source terminal to search for the destination terminal. Hence, in order to perform the direction communication, a terminal should periodically transmit a preamble via a previously allocated resource. In doing so, the terminal may be able to periodically transmit the preamble via a random access channel.

Having received the preamble from the destination terminal, the source terminal sends a direct communication request message to the destination terminal [S820]. In this case, since the source terminal is not aware of a system structure or a resource structure at all, it may be able to use an operating method similar to an initial access used by a general cellular system.

The destination terminal sends a direct communication message to the base station [S830]. The base station allocates a resource to use for the direction communication and then transmits resource allocation information to the destination terminal [S840]. In doing so, such configuration information as signal system, transmission format, power level and the like can be transmitted together with the resource allocation information.

Subsequently, the destination terminal transmits control information to the source terminal [S850]. In this case, the control information may include a synchronization channel to catch synchronization, a support of a random access and system configuration information to access a resource.

Based on the control information the destination and the source terminal match synchronization [S860]. The source terminal then transmits data to the destination terminal [S870].

The base station applies an overall resource use model via the destination terminal and performs flow, transmission format and power level settings of overall traffic.

Alternatively, instead of the step S810 and the step S820, a user may be able to set up an environment for the direct communication in a manner that a user directly sets a mode of the destination terminal to a direct communication mode to enable the destination terminal to receive necessary configuration information from the base station. In particular, if the user sets a mode of the destination terminal to the direct communication mode, the destination terminal makes a request for the direct communication to the base station. Subsequently, the base station allocates a resource to use for the direct communication to the destination terminal.

In the following description, explained is a case that both a channel status of a link A and a channel status of a link B are not good.

First of all, in case that both a channel status of a link A and a channel status of a link B are not good, since neither a source terminal nor a destination is connectible with a base station, the base station is unable to control a direct communication. In this case, if the direct communication is not supported, it may be preferable in aspect of availability of a whole network. If a specific frequency band is used for the direct communication without coordination of the base station, it may interfere with neighbor terminals.

Yet, in such a specific situation as an emergency situation, it may be able to set up a structure for a direct communication without a control by a base station. In this case, a source or destination terminal generates and transmits a signal structure for a terminal search and also configures a random system structure to perform a communication.

As mentioned in the foregoing description, if situations of source and destination terminals are actively known and a user is able to perform all corresponding works, the operations mentioned in the foregoing description can be performed. Yet, if normal convenience is taken into consideration, it may be preferable that a predetermined rule is defined for a terminal-to-terminal communication irrespective of mutual states.

For instance, in general, a base station allocates a very small amount of resource to be randomly used by general terminals and enables terminals to recognize each other via the corresponding resource. In this situation, a terminal, which becomes a source, obtains information on a terminal, which becomes a destination, by generating and transmitting such a signal as a preamble, a beacon and the like. To this end, the source terminal obtains a state of a corresponding terminal by making a request for the state of the corresponding terminal to the base station or by enabling the destination terminal to recognize the state via a preamble or beacon delivered by the source terminal via a resource previously allocated in common by the base station.

On the other hand, if a terminal itself needs not to forward information, the corresponding terminal may be able to transmit a preamble or a beacon signal to enable another terminal to deliver information to the corresponding terminal. In doing so, since the corresponding terminal is not aware of information on a source, it may transmit a signal to indicate its information only. If the source detects the corresponding signal, the source is connected to a destination terminal via a base station or may directly access the destination terminal.

According to the above method, if a source or destination terminal transmits a different kind of a preamble or beacon in accordance with a state of a corresponding terminal, it is advantageous in that user's intervention can be minimized by solving the problem in recognizing each other. Through this process, if the source terminal and the destination terminal recognize each other, as mentioned in the foregoing description of the various cases, a step of exchanging signals for the direct communication can be entered through the sequence for each terminal to obtain a resource for performing the direct communication through a communication with the base station.

Since a frequency band used by a cellular network is not generally allowed to be randomly used, it is preferable that a direct communication is not performed. Yet, if a direct communication is performed using a randomly available band such as ISM band, a signal structure can be generated by being free from a base station and the direct communication can be performed.

In particular, terminals may be able to perform a direct communication without being controlled by a base station using such a non-granted band as an ISM band. Yet, in doing so, in order to lower a level of interference with a neighbor terminal, it is preferable that coordination is received from the base station to some extent.

In the following description, explained are a method of direct communication between a source terminal and a destination terminal in case of interference with neighbor terminals due to the direct communication and a method of direct communication between a source terminal and a destination terminal in case of non-interference with neighbor terminals due to the direct communication.

First of all, in order to perform a direct communication, a channel confirming procedure and a timing setting procedure should be performed between a source terminal and a destination terminal. In due procedures, a base station allocate a resource to use for the direct communication to the terminals. And, the source or destination terminal, to which a signaling role for a search structure is designated by the base station, should transmit a control signal. In doing so, a signal sustained period may be regarded as an available period of a resource set by the base station.

In case of interference with neighbor terminals due to the direct communication, interference due to a signal structure and interference due to a resource use should be taken into consideration.

In aspect of the signal structure, a direct communication should use a signal structure used by a cellular network. For instance, if a cellular network uses OFDM/CDM signal structure, a direct communication should use the OFDM/CDM signal structure as well.

Regarding a timing of a signal, in case of generating a signal structure in downlink not to work as interference with neighbor terminals, a signal should be generated and transmitted to keep up with a downlink signal timing experienced by a terminal that transmits data. In particular, if a reception timing for downlink OFDM symbol is detected, a signal structure exactly aligned with the detected timing is preferably generated and transmitted. Signals necessary to meet this condition may include a preamble signal for a terminal-to-terminal signal search, a reference signal for channel estimation, a sequence for detecting ID of a terminal, system information containing information on a resource configuration and the like.

In case of transmission in uplink form, since collision with a signal transmitted by another terminal may occur, two kinds of structures may be provided. According to a first method, in case of an uplink transmission, an uplink timing is extracted at a reception timing point of a downlink signal. In particular, a timing advance is assumed as 0. According to a second method, an uplink signal is generated at an uplink transmission timing possessed by a terminal.

Although it is possible for the first method not to cause interference to most of neighbor terminals, the second method may be defined in a manner that an uplink timing possessed by a terminal overlaps with a downlink reception unit. In this case, it may work as interference when a neighbor terminal receives a downlink signal. And, interference of a macro cell may appear on a signal resource for a direct communication when a terminal approaching for the direct communication receives a corresponding signal.

Figure 9:
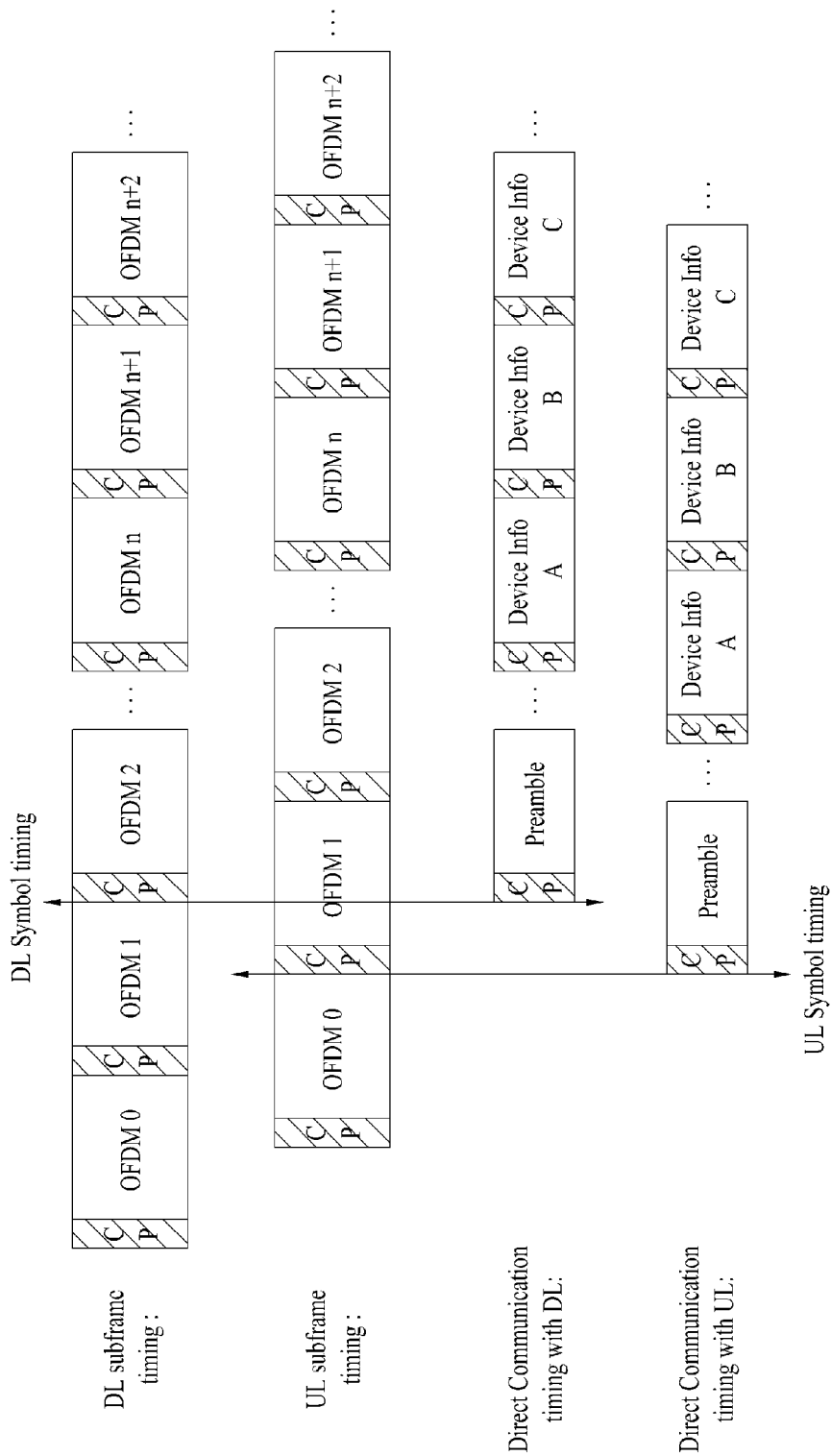
FIG. 9 is a diagram of signal transmission for a direct communication in case of matching a signal transmitted timing point to a downlink timing or in case of matching a signal transmitted timing point to an uplink timing.

FIG. 9 is a diagram of signal transmission for a direct communication in case of matching a signal transmitted timing point to a downlink timing or in case of matching a signal transmitted timing point to an uplink timing. For this reference, a start point of a timing may be defined with reference to such a predetermined time unit or start point existing in a cellular network as a subframe boundary, an OFDM symbol boundary, a frame boundary and the like.

Regarding interference due to a resource use, a resource used for a direct communication by a terminal should be allocated by a base station. If not, the base station is unable to control interference between a terminal performing the direct communication and a terminal not performing the direct communication or a terminal performing a different direct communication. Therefore, all resources should be used as a region allocated by the base station.

Regarding whether a downlink resource or an uplink resource will be used for a direct communication, since a downlink signal delivered from a base station is delivered at a uniform power level overall in aspect of a size of a signal in the vicinity of a terminal, in case that a signal structure transmitted by a direct communication is delivered by being included in a downlink, interference received by a downlink terminal from neighbors can be minimized.

On the other hand, a signal transmitted by a terminal performing a direct communication may work as interference, unless a power level is adjusted, when a different terminal neighbor to the former terminal receives a downlink signal.

Therefore, if a direct communication is performed using a downlink resource, it may require a scheme of setting a power level to an extremely low level. A base station directly sets a power level or may allow a terminal performing a direct communication to transmit a power over a predetermined level at a specific timing point of a specific signal. For instance, in case that a neighbor terminal detects a preamble signal for a direct communication, a power level of this signal may be transmitted by being boosted to a prescribed extent. Yet, a timing point or interval for transmitting a preamble may be allocated by a manner of being limited.

In case of transmitting a signal for a direct communication on an uplink resource, an uplink signal transmitted by a neighbor terminal may excessively affect a terminal performing the direct communication. In order to settle this problem, a terminal detects whether a different terminal causing high interference is present nearby and then reports a result of the detection to a base station. Thus, an uplink resource may be configured in a manner of making a request for a resource to the base station by avoiding a resource or timing used by the corresponding terminal. Therefore, the terminal needs the capability of monitoring an uplink, analyzes a received signal, and may transmit resource informations including time, frequency, code and the like in the received signals to the base station in a manner of adding features of the analyzed signal to the resource informations.

If it is unnecessary to consider interference with neighbors, a terminal may be able to use a random resource. Even if the terminal randomly uses a resource used by a cellular network or a resource using an ISM band, it may not affect neighbors. Yet, in case of utilizing a frequency resource used by a cellular network for an efficient use of resource, it is preferable that a terminal abides by a timing and resource determined by a base station. Thus, it may be able to configure an optimal direct communication environment for another terminal neighbor to the corresponding terminal likewise.

On the other hand, if a band different from that of a cellular network is used, there is no limitation put on a terminal. Yet, for a problem of interference with another RAT and coordination with another direct communication terminal, a timing and resource use structure may be limited under the control of a base station. In order to solve these problems, a terminal measures a band for performing a direct communication in time and frequency domains and may then report a result of the measurement to a base station. In this case, a random carrier position may have a random hopping structure or a center frequency varying structure in accordance with time in consideration of interference caused by another non-granted terminal operating in the vicinity.

Once a terminal performing a direct communication receives such information on a terminal transmitting a signal structure for a link D as timing, device information, resource configuration information and the like, it may be ready to start the communication in-between. Thereafter, assuming that a distance between the terminals is very short, the terminal performing the direct communication should transmit a random access signal for the connection in-between, which can be obtained according to a presence or non-presence of a terminal for setting the link D instead of being used for timing information estimation. Hence, if this random access signal is transmitted, a party in charge of the signal structure should notify a structure of a resource on which a source/destination terminal will transmit/receive data. This may be delivered via a random channel structure. Considering a hardware structure of a terminal, signal transmission and reception are preferably transmitted in downlink form if possible. Yet, if prescribed restriction is put on a downlink use, the terminal may transmit and receive signals in uplink form.

Figure 10:
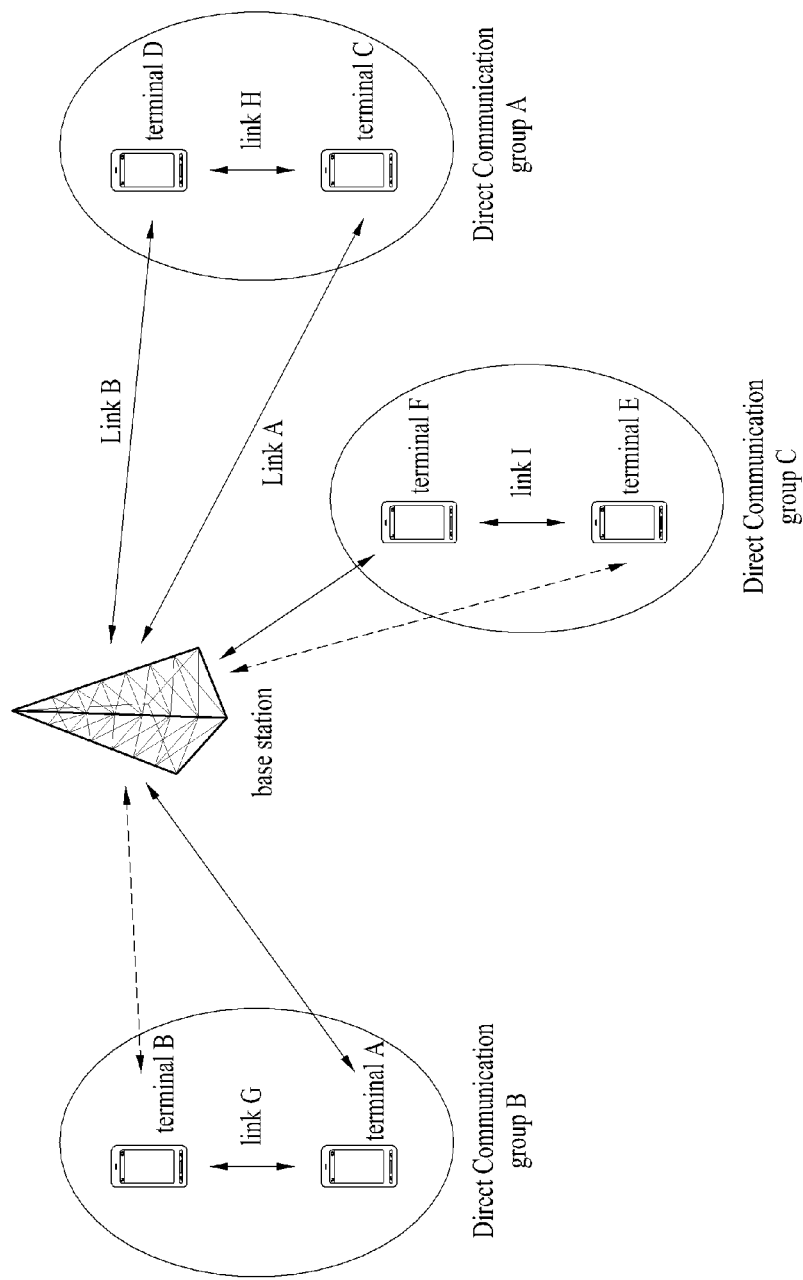
FIG. 10 is a diagram for a case that several groups of terminals performing a direct communication are present.

FIG. 10 is a diagram for a case that several groups of terminals performing a direct communication are present.

In case that several groups of terminals performing a direct communication are present, they may use the same time and frequency resources. As the time and frequency resources are used in a physically limited region only, it may be called a local spectrum or spectral localization. Referring to FIG. 10, a plurality of terminals configure one local physical area while performing direct communications in-between within a single cell.

In doing so, if the time and frequency resources overlap with another, a physical area of one direct communication group should not overlap with that of another direct communication group. On the contrary, if the time and frequency resources do not overlap with another, the physical area between the direct communication groups may be defined as an overlapping structure.

Moreover, it may be unnecessary for a link with a base station, which is configured by terminals performing a direct communication, to have a structure of being connected to one base station only. For instance, a source terminal is connected to a base station A and a destination terminal is connected to a base station B. In this case, each of the terminals may be controlled by each base station separately. Alternatively, a single base station for a direct communication is defined and the terminals may be controlled by the defined base station.

In a direct communication, HARQ (hybrid automatic retransmit request) may be omitted in accordance with a situation and may be activated as ARQ only. An acknowledge/non-acknowledge (hereinafter abbreviated ACK/NACK) structure in a physical layer may be transmitted in a manner of reusing ACK/NACK channel of a macro cell. Alternatively, the ACK/NACK structure may be defined by delivering use resource information or data rather than setting and using a control channel separately. In particular, ACK/NACK may be defined as a sort of a small packet.

In a direct communication, it is preferable that CSI-RS and C-RS (cell-specific RS) delivered by a base station are not used. And, it may be able to assume such a form as AWGN channel and the like due to a short-range communication. Considering this factor, a structure of transmitting a signal by 1 resource unit per antenna is possible. Irrespective of a structure of an actual RS, it is preferable that a terminal defines and uses a terminal-specific RS in a direct communication.

Figure 11:
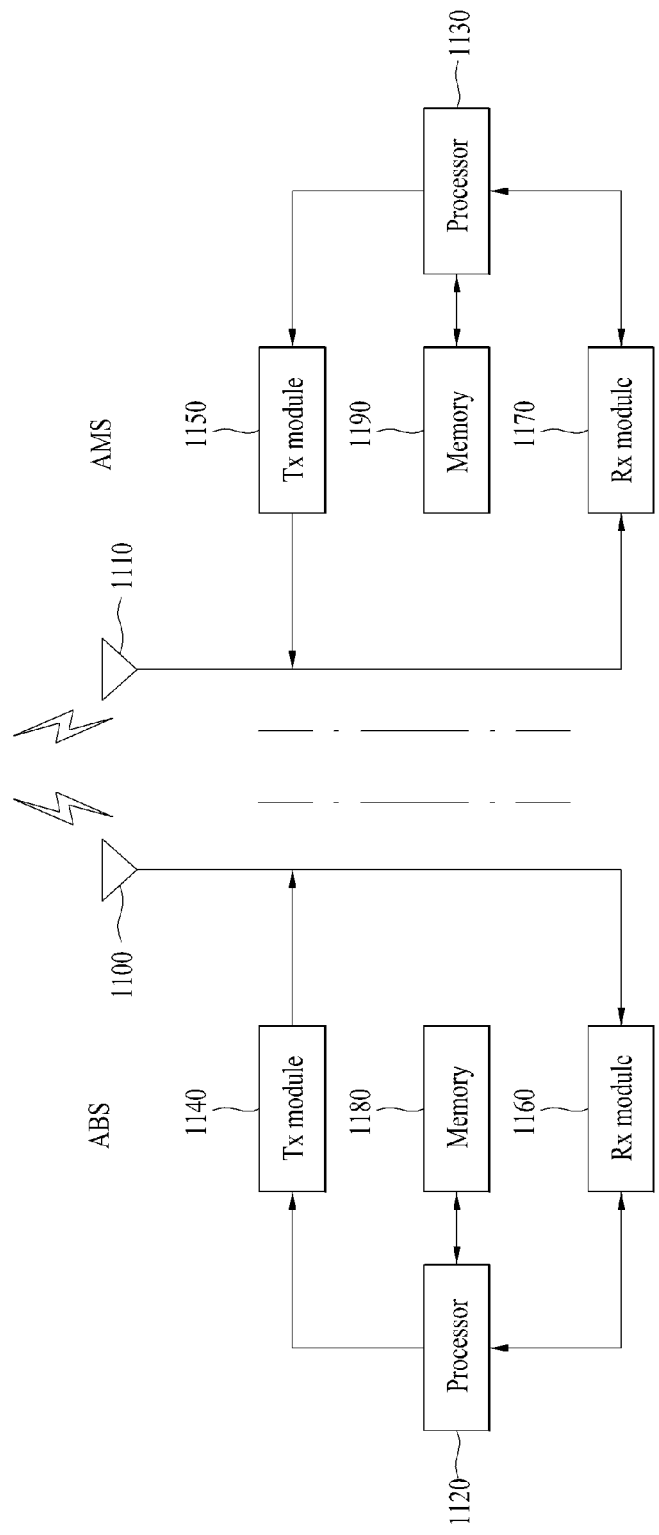
FIG. 11 is a diagram for a configuration of a mobile station and a mobile base station to implement embodiments of the present invention.

FIG. 11 is a diagram for a configuration of a mobile station and a mobile base station to implement embodiments of the present invention.

Referring to FIG. 11, a mobile station/base station (AMS/ABS) includes an antenna 1000/1010 capable of transmitting and receiving information, data, signals and/or messages and the like, a transmitting module (Tx module) 1040/1050 transmitting a message by controlling the antenna, a receiving module (Rx module) 1060/1070 receiving a message by controlling the antenna, a memory 1080/1090 storing informations associated with a communication with a base station, and a processor 1020/1030 controlling the transmitting module, the receiving module and the memory. In this case, the base station can include a femto base station or a macro base station.

The antenna 1000/1010 externally transmits a signal generated from the transmitting module 1040/1050. And, the antenna 1000/1010 receives a radio signal from outside and then forwards the received radio signal to the receiving module 1060/1070. In case that a multi-antenna (MIMO) function is supported, at least two antennas can be provided to the mobile/base station.

The processor 1020/1030 generally controls overall operations of the mobile/base station. In particular, the processor 1020/1030 is able to perform a control function for performing the above-described embodiments of the present invention, a MAC (medium access control) frame variable control function according to service characteristics and propagation environment, a handover function, an authentication function, an encryption function and the like. And, the processor 1020/1030 may further include an encryption module configured to encrypt various messages and a timer module configured to control transmission and reception of the various messages.

The processor 1020 of the base station allocates a resource used for terminals to perform a terminal-to-terminal direct communication.

The transmitting module 1040/1050 performs prescribed coding and modulation on a signal and/or data, which is scheduled by the processor and will be then transmitted externally, and is then able to forward the coded and modulated signal and/or data to the antenna 1000/1010.

The transmitting module 1050 of the mobile station periodically transmits a preamble to enable a neighbor terminal attempting to perform a direct communication with the mobile station to find the corresponding mobile station. In case of attempting to perform a direct communication with a neighbor terminal or receiving a message requesting to perform a direct communication with the mobile station from a neighbor terminal, the mobile station sends a direct communication request message for requesting to perform a direct communication with the neighbor terminal to the base station. In this case, the direct communication request message may include identification information of the neighbor terminal on which the mobile station attempts to perform the direct communication.

When the mobile station attempts to perform the direct communication with the neighbor terminal, if a channel status with the base station is not good, the transmitting module 1050 of the mobile station sends a direct communication request message to the neighbor terminal.

The transmitting module 1020 of the base station transmits resource allocation information on a resource used for the direct communication to the mobile station.

The receiving module 1060/1070 reconstructs the radio signal received externally via the antenna 1000/1010 into original data in a manner of performing decoding and demodulation on the received radio signal and is then able to forward the reconstructed original data to the processor 1020/1030.

The receiving module 1060 of the base station receives the direct communication request message from the mobile station.

The receiving module 1070 of the mobile station receives the resource allocation information on the resource allocated to the direct communication. And, the receiving module 1070 of the mobile station receives the direct communication request message from the neighbor terminal having a poor state of a communication with the base station.

The memory 1080/1090 may store programs for processing and control of the processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 1080/1090 may include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

What is claimed is:

1. In a 1st terminal of a wireless communication system, a direct communication method comprising:
   transmitting a direct communication request message to a base station to request a direct communication with a 2nd terminal without going through the base station;
   receiving resource allocation information on a resource allocated to the direct communication from the base station; and
   generating, using the resource allocation information, a control signal and a downlink signal structure for direct communication with the $2^{nd}$ terminal,
   wherein the control signal for the downlink signal structure is set to sustain according to an available period of the resource allocated to the 1st terminal, and
   wherein the downlink signal structure is exactly aligned with downlink signal timing detected by the 1st terminal.

2. A 1st terminal comprising:
   a processor;
   a transmitting module transmitting a 1st direct communication request message to a base station to request a direct communication with a 2nd terminal without going through the base station; and
   a receiving module receiving resource allocation information on a resource allocated to the direct communication from the base station; and
   a generating module generating, using the resource allocation information, a control signal and a downlink signal structure for direct communication with the $2^{nd}$ terminal,
   wherein the control signal for the downlink signal structure is set to sustain according to an available period of the resource allocated to the 1st terminal, and
   wherein the downlink signal structure is exactly aligned with downlink signal timing detected by the 1st terminal.

* * * * *